United States Patent Office 3,525,843
Patented Aug. 25, 1970

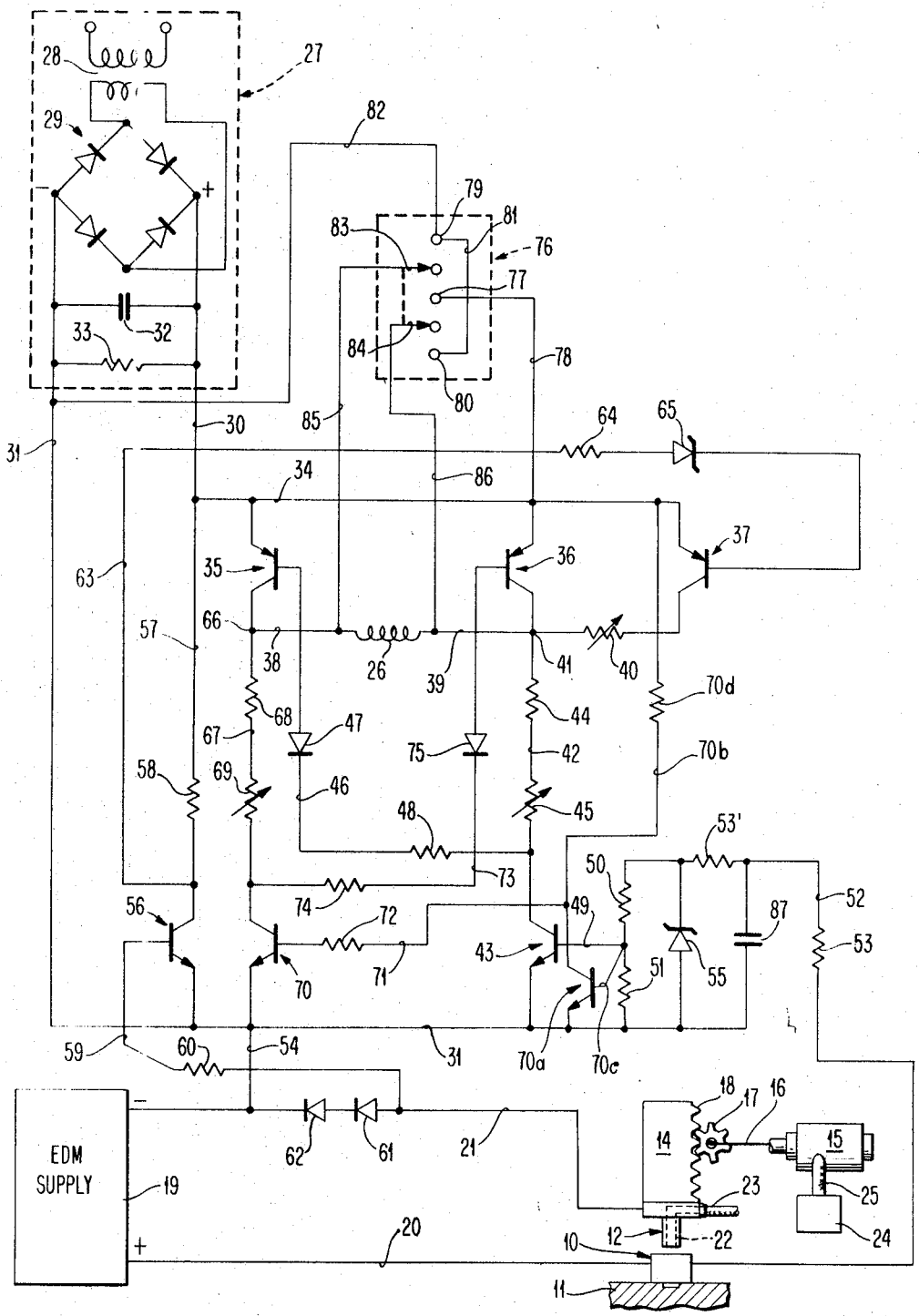

3,525,843
ELECTRICAL DISCHARGE MACHINING APPARATUS HAVING ELECTRODE FEEDRATE CONTROLLED BY GAP WIDTH
Russell F. Batterson, Fort Thomas, Ky., assignor to The Cincinnati Milling Machine Co., Cincinnati, Ohio, a corporation of Ohio
Filed Dec. 26, 1967, Ser. No. 693,458
Int. Cl. B23p 1/14
U.S. Cl. 219—69                                10 Claims

ABSTRACT OF THE DISCLOSURE

A control system includes first means responsive to a voltage exceeding a predetermined minimum value between a workpiece and a tool electrode of an electrical discharge machining apparatus and second means responsive to current flowing between the workpiece and the tool electrode. Activation of the first means causes the tool electrode to be fed toward the workpiece at a first feedrate. When the second means is activated and the voltage exceeds the predetermined minimum value whereby machining of the material is occurring due to spark discharges, the first feedrate is reduced. Furthermore, whenever there is a short circuit between the workpiece and the tool electrode, the tool electrode is moved away from the workpiece at a selected feedrate. The control system includes means to change each of the feedrates.

In electrical discharging machining (EDM) apparatuses, the tool electrode is controlled in its movements toward and away from the workpiece by a servomechanism. Thus, when an open circuit exists between the tool electrode and the workpiece, the servomechanism feeds the tool electrode toward the workpiece at one feedrate since no ionization of the dielectric fluid, which flows through the gap between the tool electrode and the workpiece, is occurring so that there is no machining of the workpiece due to spark discharges between the tool electrode and the workpiece.

When the tool electrode is moved sufficiently close to the workpiece under control of the servomechanism so that the dielectric fluid is ionized due to the potential between the tool electrode and the workpiece, machining of the workpiece occurs because of the spark discharges occurring between the tool electrode and the workpiece. Accordingly, when the tool electrode is disposed sufficiently close to the workpiece to produce machining of the workpiece, it is desired to reduce the feedrate of the tool electrode toward the workpiece in comparison with the feedrate when no machining is occurring.

It also is necessary for the servomechanism to move the tool electrode rapidly away from the workpiece whenever a short circuit exists between the tool electrode and the workpiece. When the short circuit occurs, there is a very small voltage (less than one volt) between the workpiece and the tool electrode.

A short circuit may be caused, for example, by a chip of the workpiece, which has been machined, remaining in the dielectric fluid in the gap between the tool electrode and the workpiece rather than being removed from the gap by the flow of the dielectric fluid. This conductive chip does not permit the dielectric fluid to ionize whereby the potential between the tool electrode and the workpiece cannot rise sufficiently to produce ionization and, therefore, machining of the workpiece.

Accordingly, whenever a short circuit occurs for any reason, it is necessary to move the tool electrode away from the workpiece until the cause of the short circuit is removed. For example, the chip would eventually be washed away from the gap by the dielectric fluid if the tool electrode is moved a sufficient distance from the workpiece to prevent the chip from being lodged therebetween.

It has been previously suggested to control the servomechanism in response to different magnitudes of the voltage between the tool electrode and the workpiece. In this system, when the potential reached a certain value, an open circuit was indicated whereby the servomechanism would feed the tool electrode toward the workpiece at a selected feedrate.

When ionization occurred across the dielectric fluid whereby machining of the workpiece occurred, the magnitude of the voltage decreased. This lower potential was employed by the servomechanism as a signal to reduce the feedrate of the tool electrode toward the workpiece.

In the previously suggested control system, the servomechanism was controlled by comparing the average DC value of the voltage between the tool electrode and the workpiece with a predetermined DC voltage reference source. During the course of machining, it is often necessary to change discharge duration and/or the interval of time between discharges. Thus, the average value of the DC voltage is changed. As a result, the previously suggested control system required adjustments of the DC voltage reference course to be made to insure proper machining.

The present invention is an improvement over the previously suggested control system in that the DC voltage reference source is eliminated and no adjustments are required for the previously mentioned time adjustments. The present invention automatically compensates for this type of change.

Furthermore, the control system of the present invention does not depend upon the difference in the magnitude of the voltage between open circuit conditions and machining conditions to change the feedrate of the tool electrode toward the workpiece. Instead, the control system of the present invention utilizes the absence of current flow between the tool electrode and the workpiece along with the presence of a voltage exceeding a predetermined magnitude. (It is only necessary that the potential be sufficient to not be misinterpreted as a short circuit.)

When current flow is absent so as to indicate an open circuit rather than machining occurring, the tool electrode is fed toward the workpiece at a first feedrate by the control system of the present invention. When there is current flow between the tool electrode and the workpiece with the voltage exceeding the predetermined minimum value so as to eliminate the possibility of a short circuit, these combined parameters indicate that machining of the workpiece is occurring. Accordingly, the control system of the present invention reduces the feedrate when there is current flow between the tool electrode and the workpiece with a potential exceeding a predetermined minimum existing between the tool electrode and the workpiece.

In the previously suggested system for controlling the feedrate of the tool electrode relative to the workpiece, the magnitude of the voltage between the tool electrode and the workpiece was determined by the material of the tool electrode. Thus, it was necessary to calibrate the control means of the previously suggested system in accordance with the material of the workpiece.

The present invention satisfactorily solves this problem since its signals are not affected by the material of the tool electrode. Accordingly, there is no necessity for various calibrations in accordance with the material of the tool electrode.

Since various feedrates of the tool electrode relative to the workpiece may be desired depending on various machining conditions, the present invention provides suitable means to permit each of the feedrates to be varied. Thus, the feedrates during open circuit conditions, machining conditions, and short circuit conditions may be selected as desired.

The servomechanism of the present invention also is capable of moving the tool electrode relatively to the workpiece at a maximum feedrate in each direction with this maximum feedrate being the same in each direction. Thus, when selecting the various feedrates, they are normally selected below the maximum feedrates available with the servomechanism. However, the present invention includes manual means to permit the maximum feedrate in either direction when desired.

An object of this invention is to provide a system for controlling the feed of a tool electrode relative to a workpiece in an EDM apparatus.

Another object of this invention is to provide a feed control system for an EDM apparatus that increases the efficiency of the removal of the material from the workpiece.

Other objects of this invention will be readily perceived from the following description, claims, and drawing.

This invention relates to an improvement for an electrical machining apparatus in which material is removed from a conductive workpiece by spark discharges across a machining gap between the workpiece and a tool electrode. The invention comprises means to control the movement of the tool electrode relative to the workpiece. The control means includes first means to cause movement of the tool electrode toward the workpiece at a first feedrate with the first means being responsive to a voltage exceeding a predetermined minimum between the tool electrode and the workpiece. The control means has second means cooperating with the first means to cause movement of the tool electrode toward the workpiece at a second feedrate slower than the first feedrate with the second means being responsive to flow of current between the tool electrode and the workpiece. The control means has third means to cause movement of the tool electrode away from the workpiece at a third feedrate with the third means being effective when there is a short circuit between the tool electrode and the workpiece.

The attached drawing illustrates a preferred embodiment of the invention in which the single figure is a schematic wiring diagram of the control system of the present invention being utilized with an EDM apparatus with mechanical portions of the apparatus shown in simplified form.

Referring to the drawing, there is shown an EDM apparatus to machine a workpiece 10, which is supported on a machine base 11. The EDM apparatus includes a tool electrode 12 attached to a ram 14, which is electrically insulated from the tool electrode 12.

The ram 14 is movable toward and away from the base 11 by a reversible feed hydraulic motor 15. The motor 15 drives the ram up or down through a mechanical connection 16, which terminates in a pinion 17 cooperating with a rack 18 on the ram 14. The movement of the ram 14 causes the tool electrode 12 to move toward and away from the workpiece 10.

The workpiece 10, which acts as an electrode in an electrical circuit, is connected to the positive side of an EDM supply 19, by a lead 20. The tool electrode 12 is connected to the negative side of the EDM supply 19 by a lead 21.

With the tool electrode 12 connected to the negative side of the EDM supply 19 and the workpiece 10 connected to the positive side, the tool electrode 12 is a cathode and the workpiece 10 is an anode. Accordingly, when the tool electrode 12 is brought in close proximity to the workpiece 10, sparks result, and metal is removed from the workpiece 10 in the well-known manner of the EDM process.

It should be understood that the tool electrode 12 may be connected to the positive side of the EDM supply 19 and the workpiece 10 connected to the negative side if desired. In this arrangement, the workpiece 10 becomes the cathode and the tool electrode 12 the anode. Of course, the metal is removed by spark discharges in the well-known manner of the EDM process.

The EDM supply 19 may be any suitable power supply system for furnishing negative DC pulses of a high potential at a high frequency to the tool electrode 12. One suitable system is shown and described in the patent application of Jerry E. Losey for "Electrical Discharge Machining Power Supply," Ser. No. 599,140, filed Dec. 5, 1966, and assigned to the same assignee as the assignee of the present application.

The EDM process is normally carried out in a dielectric medium such as oil, for example. Thus, the tool electrode 12 has a central passage 22 therein through which a dielectric fluid may be supplied into the machining gap. The fluid is supplied to the passage 22 under pressure from a suitable source (not shown) by a hose 23.

The feedrate, which is the velocity of movement of the tool electrode 12 relative to the workpiece 10, is determined by the speed of the motor 15 and its direction of rotation. The motor 15 is controlled by a servomechanism hydraulic valve 24, which is connected to the motor 15 through a hydraulic line 25. The servomechanism hydraulic valve 24 includes a coil 26, which is responsive to the direction of current flow through it and the magnitude of the current to determine both the direction of rotation of the motor 15 and its speed, and other components well known in the art of hydraulic servomechanisms.

Within limits, the rate of rotation of the motor 15 is proportional to the magnitude of the current flowing through the coil 26. Accordingly, the greater the magnitude of the current flowing through the coil 26, the faster that the motor 15 is rotated. As the speed of the motor 15 is increased, the feedrate of the tool electrode 12 toward or away from the workpiece 10 is increased.

The direction of current flow through the coil 26 determines the direction of rotation of the motor 15 whereby the direction of movement of the tool electrode 12 relative to the workpiece 10 is determined. Accordingly, the control system of the present invention is utilized to regulate the magnitude and direction of the current flowing through the coil 26 whereby the feedrate of the tool electrode 12 relative to the workpiece 10 is regulated.

The control system of the present invention has a power supply 27, which is separate from the EDM supply 19. The power supply 27 furnishes the current that flows through the coil 26 of the servomechanism 24.

The power supply 27 includes a transformer 28 and a full-wave rectifier 29. The power supply 27 has a positive output lead 30 and a negative return lead 31 with a capacitance 32 and a resistor 33 connected therebetween in parallel to reduce the ripple whereby a DC voltage and current are supplied through the positive lead 30 of the power supply 27 and are returned to the power supply 27 through the negative lead 31.

The positive lead 30 is connected through a lead 34 to emitters of PNP transistors 35, 36, and 37. Thus, positive potential is applied to the emitters of each of the transistors 35, 36, and 37.

The collector of the transistor 35 is connected through a lead 38 to one side of the coil 26 of the servomechanism 24. The other side of the coil 26 is connected through a lead 39 to the collector of the transistor 36.

The collector of the transistor 37 is connected to the collector of the transistor 36 through a rheostat or variable resistor 40. Accordingly, the circuit comprising the transistor 37 and the rheostat 40 is parallel to the transistor 36. Thus, the circuit comprising the transistor 37 and the rheostat 40 also is in parallel with the transistor 35 and the coil 26 because of the connection at common point 41.

A lead 42 connects the common point 41 to an NPN transistor 43. The transistor 43 has its collector connected to the lead 42 while its emitter is connected to the negative lead 31 of the power supply 27. The lead 42 has a resistor 44 and a rheostat or variable resistor 45 connected in series therewith.

The base of the transistor 35 is connected through a lead 46, which has a blocking diode 47 and a current limiting resistor 48 therein, to the lead 42 between the rheostat 45 and the collector of the transistor 43. Thus, the base of the transistor 35 can be made negative with respect to its emitter whereby the transistor 35 is saturated so as to be in a conductive state only when the transistor 43 is in a conductive state.

Accordingly, since the transistor 35 can only be saturated when the transistor 43 is turned on, a circuit is formed from the positive lead 34 through the transistor 35, the coil 26, the lead 42 and the transistor 43 to the negative lead 31. This results in current flowing in one direction through the coil 26 of the servomechanism 24 to produce a first feedrate of the tool electrode 12. When the current flows through the coil 26 from the collector of the transistor 35 to the lead 42 through the common point 41, this direction of current flow causes the motor 15 to feed the tool electrode 12 toward the workpiece 10.

Since the value of the rheostat 45 may be varied, the current flowing through this circuit also may be varied. Accordingly, if the value of the rheostat 45 is increased, the current flow through the coil 26 is decreased whereby the feedrate is reduced. Likewise, lowering the value of the rheostat 45 causes a rise in the current flow through the coil 26 to increase the feedrate of the tool electrode 12 toward the workpiece 10. Accordingly, the rheostat 45 permits varying the feedrate of the tool electrode 12 toward the workpiece 10.

The transistor 43 is saturated whenever a voltage exceeding a predetermined minimum exists between the workpiece 10 and the tool electrode 12. This predetermined minimum voltage is selected so that the transistor 43 is conductive whenever there is an open circuit between the workpiece 10 and the tool electrode 12 or machining of the workpiece 10. This predetermined minimum voltage need only be greater than the very small voltage produced by a short circuit.

The transistor 43 has its base connected by a lead 49 to a voltage divider, which comprises series connected resistors 50 and 51. One end of the voltage divider is connected through a lead 52, which has current limiting resistors 53 and 53' therein, to the workpiece 10. The other end of the voltage divider is connected to the negative potential on the tool electrode 12 since the negative lead 31 of the power supply 27 is connected to the negative lead 21 of the EDM supply 19 through a connecting lead 54. Accordingly, the voltage between the workpiece 10 and the tool electrode 12, which is the voltage across the gap, is connected across the voltage divider.

Since it is not desired for the full voltage between the workpiece 10 and the tool electrode 12 to appear across the base to emitter junction of the transistor 43, a Zener diode 55 is connected in parallel with the resistors 50 and 51. The Zener diode 55 is selected to break down when there is some preselected voltage across it such as 6.8 volts. Thus, most of the current flows through the Zener diode 55 rather than through the voltage divider of the resistors 50 and 51. The Zener diode 55 maintains the preselected voltage across the voltage divider of the resistors 50 and 51 irrespective of the voltage between the workpiece 10 and the tool electrode 12 during machining or open circuit conditions.

It should be understood that the full voltage of the EDM supply 19 is probably a minimum of 80 volts and may be much larger. Likewise, during machining, the voltage is still a minimum of at least 20 volts even though the voltage across the gap has reduced substantially from that of the EDM supply 19 due to machining. Because of the Zener diode 55, only 6.8 volts will appear across the voltage divider rather than these two large potentials.

Accordingly, the transistor 43 is controlled in accordance with the potential between the workpiece 10 and the tool electrode 12. Whenever the potential exceeds the Zener diode 55 breakdown voltage of 6.8 volts, the transistor 43 is turned on because the base of the transistor 43 becomes positive with respect to the emitter since it is connected to the positive workpiece 10 through the series resistors 50, 53', and 53. Thus, whenever there is an open circuit or machining is occurring, the potential between the workpiece 10 and the tool electrode 12 is sufficient to cause the transistor 43 to be saturated.

When the transistor 43 saturates, the potential at its collector is substantially equal to its emitter voltage. Since the base of the transistor 35 is connected to the collector of the transistor 43 by the lead 46, the base of the transistor 35 becomes negative with respect to its emitter. As a result, current flows through the coil 26 from the collector of the transistor 35 to the common point 41 and through the transistor 43 to the negative lead 31 of the power supply 27 when there is either an open circuit or machining. Either of these conditions produces a sufficient potential to cause the transistor 43 to conduct.

When there is a short circuit, the potential between the tool electrode 12 and the workpiece 10 is less than one volt. This voltage is not sufficient to cause the transistor 43 to be conductive because the base of the transistor 43 is not sufficiently positive with respect to its emitter to cause the transistor 43 to become saturated.

Accordingly, current flow through the coil 26 due to the transistors 35 and 43 being turned on produces movement of the tool electrode 12 toward the workpiece 10. This is desired whenever there is an open circuit between the tool electrode 12 and the workpiece 10 to indicate that the tool electrode 12 is too far away from the workpiece 10 to produce machining or there is machining occurring and it is desired to advance the tool electrode 12 toward the workpiece 10 because of this machining.

As previously mentioned, the circuit comprising the transistor 37 and the rheostat 40 is disposed in parallel with the portion of the circuit including the transistor 35 and the coil 26. Therefore, the magnitude of the current flowing through the coil 26 when the transistors 35 and 43 are conductive is lowered if the transistor 37 is in a conductive state. The amount of reduction of the current depends upon the resistance of the rheostat 40.

When the transistor 37 is turned on, the reduction of current flow to the coil 26 causes the speed of rotation of the motor 15 to be reduced whereby the feedrate of the tool electrode 12 toward the workpiece 10 is reduced; thus, a second feedrate, lower than a first feedrate, is produced. By appropriately selecting the value of the rheostat 40, this second feedrate is determined. The second feedrate is desired when machining of the workpiece 10 is occurring.

Accordingly, the transistor 37 is saturated when current flows between the workpiece 10 and the tool electrode 12. Current flows between the workpiece 10 and the tool electrode 12 when machining of the workpiece 10 is occurring but it does not flow when there is an open circuit so that the transistor 37 is turned off when an open circuit exists. Thus, the transistor 37 is employed to change the feedrate of the tool electrode 12 toward the workpiece 10 in accordance with whether there is an open circuit between the workpiece 10 and the tool electrode 12 or machining.

The transistor 37 can be saturated only when an NPN transistor 56 is in its conductive state. The transistor 56 has its collector connected to the positive lead 30 of the power supply 27 by a lead 57, which has a resistor 58 therein, and its emitter connected to the negative lead 31 of the power supply 27. The transistor 56 has its base connected by a lead 59, which has a current limiting resistor 60 therein, to the lead 21 between a diode 61 and the tool electrode 12.

Because the lead 54 is connected to the lead 21 between the EDM supply 19 and a diode 62, the voltage drop across the diodes 61 and 62, which are high current and low voltage diodes, due to current flowing between the workpiece 10 and the tool electrode 12 is applied between the base and emitter of the transistor 56. Accordingly, the transistor 56 has its base positive with respect to its emitter whereby the transistor 56 is saturated whenever current flows between the workpiece 10 and the tool electrode 12.

The transistor 37 has its base connected to the collector of the transistor 56 through a lead 63, which has a current limiting resistor 64 and a Zener diode 65 therein. When the transistor 56 conducts, current flows through the resistor 58 to cause a voltage drop whereby the base of the transistor 37 becomes negative with respect to the emitter. As a result, the transistor 37 becomes conductive.

Since there may be some leakage current through the transistor 56 even when it is turned off, the Zener diode 65 insures that the slight amount of voltage drop across the resistor 58 due to the leakage current will not cause the transistor 37 to become conductive. The Zener diode 65 requires a breakdown potential of 5.1 volts before flow of current may occur to cause the potential at the collector of the transistor 56 to be applied to the base of the transistor 37. Accordingly, the transistor 37 cannot become conductive due to leakage current through the transistor 56.

Since the current flows from the workpiece 10 to the tool electrode 12 whenever machining is occurring, the transistor 37 is turned on whenever machining occurs. As a result, a portion of the current, which flows through the coil 26 from the transistor 35 to the common point 41 when the transistor 37 is turned off, flows through the rheostat 40 when the transistor 37 is turned on. This reduces the amount of current flowing through the coil 26 in comparison with that flowing through the coil 26 when the transistors 35 and 43 are turned on while the transistor 37 is turned off.

Accordingly, a lower feedrate of the tool electrode 12 toward the workpiece 10 occurs when current flows between the workpiece 10 and the tool electrode 12 and a sufficient potential exists between the workpiece 10 and the tool electrode 12 to indicate the absence of a short circuit. Thus, the control system of the present invention provides the second feedrate, which is lower than the first feedrate, for feeding the tool electrode 12 toward the workpiece 10 when machining is occurring.

When there is a short circuit, it is desired to rapidly move the tool electrode 12 away from the workpiece 10. This requires the current to flow through the coil 26 from the common point 41 toward a common point 66, which is the connection of the lead 38 to the collector of the transistor 35. The common point 66 is connected to the negative lead 31 of the power supply 27 through a lead 67, which has a resistor 68 and a rheostat or variable resistor 69 therein, and an NPN transistor 70.

The transistor 70 has it collector connected to the lead 67 and its emitter connected to the negative lead 31 of the power supply 27. Thus, if the transistors 36 and 70 are saturated, current can flow through the coil 26 in the direction from the common point 41 to the common point 66. This is the opposite direction to current flow when the transistors 35 and 43 are in a conductive state.

Accordingly, the current flow from the common point 41 to the common point 66 results in the motor 15 rotating in the opposite direction to retract the tool 12 from the workpiece 10. This is desired whenever there is a short circuit between the workpiece 10 and the tool electrode 12.

Whenever there is a short circuit between the workpiece 10 and the tool 12, current flow occurs almost as soon as the pulse of the EDM supply 19 starts to build up. As a result, there is practically no voltage existing between the workpiece 10 and the tool electrode 12.

This results in the transistor 43 and an NPN transistor 70a being turned off. The transistor 70a has its collector connected by a lead 70b to the lead 34 and its emitter connected to the negative return lead 31. The base of the transistor 70a is connected by a lead 70c to the voltage divider at the same point as the transistor 43. Thus, the transistor 70a turns on and off whenever the transistor 43 turns on and off.

By connecting the base of the transistor 70 through a lead 71, which has a current limiting resistor 72 therein, to the lead 70b between a resistor 70d in the lead 70b and the collector of the transistor 70a, the voltage at the collector of the transistor 70a is transmitted to the base of the transistor 70.

When the transistor 70a saturates, the collector and the emitter of the transistor 70a are at substantially the same potential. Since the emitter of the transistor 70 is at the same potential as the emitter of the transistor 70a because of their connection to the common negative lead 31, the emitter of the transistor 70 will have substantially the same potential as the collector of the transistor 70a. Since the base of the transistor 70 is connected to the collector of the transistor 70a through the lead 71, there is insufficient difference in potential between the base and the emitter of the transistor 70 whereby the transistor 70 is turned off whenever the transistor 70a is in its conductive state.

When the transistor 70 is turned off, its collector has substantially the same potential as the potential on the positive lead 34. This is because the collector and the emitter of the transistor 35 are at substantially the same potential when the transistor 35 is conducting. Since the transistor 35 conducts when the transistor 43 conducts and the transistor 70 is turned off at this time, the collector of the transistor 70 is at substantially the potenial of the collector of the transistor 35. It should be understood that there is no current flow through the lead 67 when the transistor 70 is turned off.

Accordingly, the potential at the collector of the transistor 70 is substantially the same as the potential on the positive supply lead 34. By connecting the potential at the collector of the transistor 70 through a lead 73, which has a current limiting resistor 74 and a blocking diode 75 therein, to the base of the transistor 36, the transistor 36 is turned off because there is no difference of potential between its collector and base. Therefore, current cannot flow from the common point 41 to the common point 66 through the coil 26 when the transistors 36 and 70 are turned off.

However, when there is a short circuit, the transistors 43 and 70a are turned off. As a result, the collector potential of the transistor 70a becomes greater than its emitter voltage whereby the base of the transistor 70 has a greater potential than the emitter. As a result, the transistor 70 becomes saturated when the transistor 70a is turned off.

When the transistor 70 is turned on, the potential of its collector becomes less than the potential at the positive lead 34 because current is flowing through the transistor 70 to produce a voltage drop across the resistor 68 and the potentiometer 69. As a result, the base of the transistor 36, which is connected to the collector of the transistor 70 through the lead 73, becomes negative with respect to its emitter whereby the transistor 36 conducts.

When the transistor 43 is turned off so that its collector potential increases, the potential at the base of the transistor 35 increases because the potential of the collector of the transistor 43, which is turned off, is substantially the same as the potential of the collector of the transistor 36, which is now turned on. Since the collector potential of the transistor 36 is substantially equal to the potential of its emitter and its emitter potential is the voltage on the positive lead 34, there is no substantial voltage difference between the emitter and the base of the transistor 35. Accordingly, the transistor 35 is turned off.

Since the transistors 36 and 70 are turned on when the transistors 43 and 70a are turned off, current flows from the common point 41 to the common point 66 only when there is substantially no voltage between the workpiece 10 and the tool electrode 12. Otherwise, the transistors 43 and 70a could not have been turned off.

The substantial absence of any voltage between the workpiece 10 and the tool electrode 12 indicates a short circuit. Thus, the presence of only a very small voltage (less than one volt) results in current flowing through the coil 26 from the common point 41 to the common point 66. As a result, the tool electrode 12 is rapidly moved away from the workpiece 10. The feedrate of the tool electrode 12 away from the workpiece 10 is determined by the value of the rheostat 69. The magnitude of current flow through the coil 26 is reduced when the value of the rheostat 69 is increased and is increased when the value of the rheostat 69 is decreased.

When there is a short circuit between the workpiece 10 and the tool electrode 12, current also flows therebetween. This results in the transistor 56 being turned on because of the voltage drop across the diodes 61 and 62 in the manner previously mentioned when machining is occurring. This causes the transistor 37 to turn on whereby the current from the positive lead 34 to the common point 41 is divided between the transistor 36 and the circuit containing the transistor 37 and the rheostat 40. However, all of this current flows through the coil 26 from the common point 41 to the common point 66. Therefore, the rheostat 40 does not affect the magnitude of current flowing through the coil 26 from the common point 41 to the common point 66. Thus, the feedrate of the tool electrode 12 away from the workpiece 10 is controlled only by the value of the rheostat 69.

The control system of the present invention also includes manual means for feeding the tool electrode 12 in either direction relative to the workpiece 10. The manual means permits the maximum feedrate of the tool electrode 12 relative to the workpiece 10 in either direction since there are no resistors in the manual control circuitry.

The manual control circuitry includes a switch 76, which has a contact 77 connected through a lead 78 to the positive lead 34. The switch 76 also has contacts 79 and 80, which are connected to each other by a lead 81, connected through a lead 82 from the contact 79 to the negative lead 31 of the power supply 27. The switch 76 includes switch members 83 and 84, which are mechanically connected to each other for simultaneous movement together. The switch member 83 is connected by a lead 85 to the lead 38 on one side of the coil 26 while the switch member 84 is connected by a lead 86 to the lead 39 on the other side of the coil 26.

When the switch member 83 engages the negative contact 79 and the switch member 84 engages the positive contact 77, current flows through the coil 26 in a direction to move the tool electrode 12 away from the workpiece 10. When the switch member 83 engages the positive contact 77 and the switch member 84 engages the negative contact 80, current flows through the coil 26 in the direction to move the tool electrode 12 toward the workpiece 10. This movement in either direction is at the fastest feedrate since there are no current reducing resistors in the manual control circuitry.

Considering the operation of the present invention, an open circuit exists between the workpiece 10 and the tool electrode 12 if the tool electrode 12 is disposed any distance from the workpiece 10; it is so disposed before machining occurs. Thus, in the open circuit condition, the transistors 43, 70a, and 35 are turned on to cause a fast feedrate of the tool electrode 12 toward the workpiece 10 because of the larger flow of current through the coil 26 from the common point 66 to the common point 41.

As the tool electrode 12 approaches the workpiece 10, the distance between the tool electrode 12 and the workpiece 10 becomes sufficiently small to permit ionization of the dielectric fluid flowing through the gap between the workpiece 10 and the tool electrode 12 to cause ionization thereof. As a result, current flows between the workpiece 10 and the tool electrode 12. When this occurs, the transistors 56 and 37 also become saturated to permit current flow through the transistor 37 in parallel to current flow through the transistor 35. As a result, the feedrate of the tool electrode 12 toward the workpiece 10 is reduced because of the smaller magnitude of current flow through the coil 26.

If a short circuit condition should exist between the workpiece 10 and the tool electrode 12, there is no build up of the potential from the EDM supply 19. As a result, the voltage between the workpiece 10 and the tool electrode 12 is not sufficient to maintain the transistors 43 and 70a in a conductive state. Thus, the transistors 43, 70a, and 35 are turned off, and the transistors 36 and 70 turned on. As a result, the direction of flow of current through the coil 26 is reversed, and the tool electrode 12 is moved away from the workpiece 10 at a very rapid rate.

Of course, the transistors 56 and 37 also are turned on when there is a short circuit condition because current flows between the workpiece 10 and the tool electrode 12 due to the short circuit. However, this does not affect the feedrate of the tool electrode 12 away from the workpiece 10.

If manual feed of the tool electrode 12 relative to the workpiece 10 is desired, it is only necessary to connect the switch members 83 and 84 of the switch 76 to the appropriate contacts of the switch 76. For example, when first starting operation, it is desired to move the tool electrode 12 relatively close to the workpiece 10 rather than depend upon any type of automatic movement thereof. Thus, the switch member 83 is moved into engagement with the positive contact 77 and the switch member 84 is moved into engagement with the negative contact 80 to cause movement of the tool electrode 12 toward the workpiece 10 at a rapid rate.

It should be understood that the blocking diode 47 is employed to insure that the transistor 35 does not accidentally turn on when the transistor 43 is turned off. Because of the possibility of a leakage current through the transistor 43, there could be a voltage drop across the resistor 44 and the potentiomeber 45 whereby the collector of the transistor 43 would not have substantially the same potential as the collector of the transistor 36. Because of the blocking diode 47, the potential difference due to the voltage drop caused by leakage current is not sufficient to cause the diode 47 to permit current to flow therethrough.

Likewise, the blocking diode 75 in the lead 73 serves the same function. That is, when the transistor 70 is turned off, there might be some slight leakage therethrough whereby the voltage drop across the resistor 68 and the rheostat 69 would be sufficient to turn on the transistor 36 even when the transistor 70 is turned off. However, this voltage drop is not sufficient to permit the blocking diode 75 to allow current to flow therethrough whereby the transistor 36 cannot be accidentally turned on when the transistor 70 is turned off.

The control system also includes means to insure that the transistors 43 and 70a remain saturated between discharges between the workpiece 10 and the tool electrode 12. Otherwise, the transistors 43 and 70a would turn off after each discharge and before the next pulse is supplied.

The means comprises an R-C circuit of the resistor 53' and a capacitor 87. The time constant of the R-C circuit is chosen so that the transistors 43 and 70a do not turn off between pulses.

The capacitor 87 is charged through the resistor 53 whenever there is voltage between the workpiece 10 and the tool electrode 12 due to an open circuit or machining. Due to the presence of the diodes 61 and 62, the capacitor 87 cannot discharge through the EDM supply 19. However, when a short occurs, the capacitor 87 can rapidly discharge through the resistor 53, the workpiece 10, and the tool electrode 12 to cause the transistors 43 and 70a to turn off.

An advantage of this invention is that it eliminates any requirement for a control system, which regulates the movement of a tool electrode relative to the workpiece in an EDM apparatus, to be responsive to different magnitudes of the voltage between the workpiece and the tool electrode for feeding the tool electrode toward the workpiece. Another advantage of this invention is that it is not sensitive to changes in the materials of the tool electrode and the workpiece. A further advantage of this invention is that it does not depend on a specified magnitude of current flow between the workpiece and the tool electrode to indicate machining occurring therebetween but only on the presence of a current therebetween. Still another advantage of this invention is that the requirement for a DC voltage reference source is eliminated. Since the transistors are switched into on and off states rather than being utilized as amplifiers, the control system of the present invention is relatively insensitive to temperature whereby leakage is less of a problem.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. In an electrical machining apparatus for removing material from a conductive workpiece by spark discharges across a machining gap between the workpiece and a tool electrode, the improvement comprising:

means to control the movement of the tool electrode relative to the workpiece;
said control means including:
first means to cause movement of the tool electrode toward the workpiece at a first feedrate, said first means being non-variably responsive to the presence of any voltage exceeding a predetermined minimum between the tool electrode and the workpiece;
second means cooperating with said first means to cause movement of the tool electrode toward the workpiece at a second feedrate slower than the first feedrate, said second means being non-variably responsive to flow of any current between the tool electrode and the workpiece;
and third means to cause movement of the tool electrode away from the workpiece at a third feedrate, said third means being responsive to a reduced gap voltage when there is a short circuit between the tool electrode and the workpiece.

2. The improvement according to claim 1 including means to vary at least one of the feedrates.

3. The improvement according to claim 1 including means to vary each of the feedrates.

4. The improvement according to claim 1 in which said control means includes manual means to cause movement of the tool electrode toward or away from the workpiece at a feedrate greater than any of the aforesaid feedrates.

5. The improvement according to claim 1 in which:
said control means includes current responsive means to control movement of the tool electrode relative to the workpiece;
said first means comprises first switch means to supply a current of a selected magnitude in one direction to said current responsive means to produce the first feedrate;
said second means comprises means to reduce the magnitude of the current supplied to said current responsive means by said first means to produce the second feedrate;
and said third means comprises second switch means to supply a current in the opposite direction to said current responsive means to produce the third feedrate.

6. The improvement according to claim 1 in which:
said control means includes a coil of a servomechanism controlling the movement of the tool electrode relative to the workpiece;
said first means comprises first switch means to allow current to flow in one direction through said coil with a selected magnitude whereby the first feedrate is produced;
said second means comprises means connected in parallel with said coil to reduce the current flow allowed through said coil by said first switch means whereby the second feedrate is produced;
and said third means comprises second switch means to allow current to flow in the opposite direction through said coil whereby the third feedrate is produced.

7. The improvement according to claim 6 in which:
said first switch means comprises a first pair of transistors connected in series with said coil with said transistors connected to opposite sides of said coil;
one of said transistors being in a conductive state when a voltage exceeding a predetermined minimum exists between the tool electrode and the workpiece;
and the other of said transistors being in a conductive state only when said one transistor is in a conductive state.

8. The improvement according to claim 7 in which said second switch means comprises:
a second pair of transistors connected in series with said coil with said transistors connected to opposite sides of said coil;
and said second pair of transistors being in a conductive state only when said first pair of transistors is turned off.

9. The improvement according to claim 7 in which:
said second means includes first and second transistors;
said first transistor being in a conductive state when current flows between the tool electrode and the workpiece;
said second transistor being in a conductive state only when said first transistor is in a conductive state;
said second transistor being disposed in a circuit parallel to one of said first pair of transistors and said coil;
and the circuit includes means to vary the current flow therethrough whereby the magnitude of the current flowing in said one direction through said coil is reduced.

10. The improvement according to claim 8 in which:
said second means includes first and second transistors;
said first transistor being in a conductive state when current flows between the tool electrode and the workpiece;
said second transistor being in a conductive state only when said first transistor is in a conductive state;
said second transistor being disposed in a circuit parallel to one of said first pair of transistors and said coil;
and the circuit includes means to vary the current flow therethrough whereby the magnitude of the current flowing in said one direction through said coil is reduced.

References Cited

UNITED STATES PATENTS 2,762,946   9/1956   Manchester.
3,370,147   2/1968   Matulaitis.
3,435,176   3/1969   Lobur.

RALPH F. STAUBLY, Primary Examiner